(12) United States Patent
Shin

(10) Patent No.: US 12,539,269 B2
(45) Date of Patent: Feb. 3, 2026

(54) COMPOSITION FOR BLOCKING ULTRAVIOLET RAYS AND FINE DUST, AND PREPARATION METHOD THEREOF

(71) Applicant: SANG HWANG MI-IN CO., LTD, Busan (KR)

(72) Inventor: Youngsang Shin, Busan (KR)

(73) Assignee: SANG HWANG MI-IN CO., LTD, Busan (KR)

( * ) Notice: Subject to any disclaimer, the term of this patent is extended or adjusted under 35 U.S.C. 154(b) by 392 days.

(21) Appl. No.: 18/038,046

(22) PCT Filed: Nov. 23, 2020

(86) PCT No.: PCT/KR2020/016542
§ 371 (c)(1),
(2) Date: Jun. 28, 2023

(87) PCT Pub. No.: WO2022/107942
PCT Pub. Date: May 27, 2022

(65) Prior Publication Data
US 2023/0404903 A1    Dec. 21, 2023

(30) Foreign Application Priority Data
Nov. 20, 2020   (KR) .......................... 10-2020-0156168

(51) Int. Cl.
*A61K 36/00* (2006.01)
*A61K 8/9728* (2017.01)
*A61Q 17/04* (2006.01)
*A61Q 19/08* (2006.01)

(52) U.S. Cl.
CPC ............ *A61K 8/9728* (2017.08); *A61Q 17/04* (2013.01); *A61Q 19/08* (2013.01)

(58) Field of Classification Search
CPC .................................................. A61K 8/9728
See application file for complete search history.

(56) References Cited

FOREIGN PATENT DOCUMENTS

| | | | |
|---|---|---|---|
| CA | 3040784 A1 * | 10/2020 | ........... A61K 8/9728 |
| KR | 10-1055447 B1 | 8/2011 | |
| KR | 10-2013-0019887 A | 2/2013 | |
| KR | 10-2014-0127085 A | 11/2014 | |
| KR | 10-2019-0066409 A | 6/2019 | |
| KR | 10-2059954 B1 | 12/2019 | |
| KR | 10-2020-0029289 A | 3/2020 | |

* cited by examiner

*Primary Examiner* — Qiuwen Mi
(74) *Attorney, Agent, or Firm* — Blank Rome LLP

(57) ABSTRACT

A composition for treating skin damage caused by fine dust and ultraviolet rays according to the present invention contains extracts of black hoof mushrooms, shiitake mushrooms and oyster mushrooms, uses natural ingredients as the main ingredients, thus having the effect of relieving heavy metal damage and skin irritation caused by fine dust and ultraviolet rays without irritating the skin, and has the effect of protecting the skin.

2 Claims, No Drawings
Specification includes a Sequence Listing.

```
                          SEQUENCE LISTING

<160> NUMBER OF SEQ ID NOS: 6

<210> SEQ ID NO 1
    <211> LENGTH: 20
    <212> TYPE: DNA
    <213> ORGANISM: Artificial Sequence
    <220> FEATURE:
    <223> OTHER INFORMATION: MC1R-F

<400> SEQUENCE: 1
cctctgcctc aagggtgctg                                              20

<210> SEQ ID NO 2
    <211> LENGTH: 21
    <212> TYPE: DNA
    <213> ORGANISM: Artificial Sequence
    <220> FEATURE:
    <223> OTHER INFORMATION: MC1R-R

<400> SEQUENCE: 2
tcaacagtgg agctgaggac g                                            21

<210> SEQ ID NO 3
    <211> LENGTH: 24
    <212> TYPE: DNA
    <213> ORGANISM: Artificial Sequence
    <220> FEATURE:
    <223> OTHER INFORMATION: AhR-F

<400> SEQUENCE: 3
ggtgcctgct ggataattca tctg                                         24

<210> SEQ ID NO 4
    <211> LENGTH: 23
    <212> TYPE: DNA
    <213> ORGANISM: Artificial Sequence
    <220> FEATURE:
    <223> OTHER INFORMATION: AhR-R

<400> SEQUENCE: 4
tcgtccttct tcatccgtca gtg                                          23

<210> SEQ ID NO 5
    <211> LENGTH: 24
    <212> TYPE: DNA
    <213> ORGANISM: Artificial Sequence
    <220> FEATURE:
    <223> OTHER INFORMATION: beta-actin-F

<400> SEQUENCE: 5
tggaatcctg tggcatccat gaaa                                         24

<210> SEQ ID NO 6
    <211> LENGTH: 25
    <212> TYPE: DNA
```

```
<213> ORGANISM: Artificial Sequence
<220> FEATURE:
<223> OTHER INFORMATION: beta-actin-R

<400> SEQUENCE: 6
taaaacgcag ctcagtaaca gtccg                                              25
```

COMPOSITION FOR BLOCKING ULTRAVIOLET RAYS AND FINE DUST, AND PREPARATION METHOD THEREOF

SEQUENCE LISTING

The instant application contains a Sequence Listing which has been submitted electronically in XML format and is hereby incorporated by reference in its entirety. Said XML copy, created on Oct. 22, 2025, is named 23-214US-SequenceListing-ST26.xml and is 8,684 bytes in size.

TECHNICAL FIELD

The present invention relates to a cosmetic composition including an extract of a black hoof mushroom, a shiitake mushroom, and an oyster mushroom and a method of preparing the same, and relates to a cosmetic composition which protects the skin from fine dust and ultraviolet rays.

BACKGROUND ART

The skin is a primary protective organ which prevents damage from external factors which interferes with homeostasis of our body. That is, the skin performs chemical, physical, and biological barrier functions from the outside, but since the skin is in contact with various environmental factors, it is damaged. Major external stress factors include ultraviolet rays, fine dust, yellow dust, rapid temperature and humidity changes, and the like.

Recently, fine dust is considered to be the biggest harmful factors to health. The fine dust infiltrates the body through the skin as well as a respiratory organ. The fine dust containing heavy metals, endocrine disruptors, and the like breaks down the skin barrier and infiltrates the body. In addition, fine dust having a diameter of about 0.01 mm easily passes through pores having a diameter 2 to 5 times that of fine dust.

The fine dust passed through may cause an inflammatory response and damage the skin barrier to aggravate skin dryness and atopic dermatitis. In addition, PAH attached to the fine dust may proliferate melanocytes to increase pigment spots on the face.

Besides, carbon particles containing organic components in fine dust in the air are a main constituent element which accounts for 20 to 90% of the mass concentration of fine dust, and it is known that three of these, which are polycyclic aromatic hydrocarbons (PAHs), volatile organic compounds (VOCs), and aldehydes, are main air pollutants which are highly toxic to the human body. Among them, since PAHs were revealed to have a high incidence of skin cancer among coal workers in the late 19th century, they have been an important indicator of hazardous air pollutants (HAPs). Expression of an aryl hydrocarbon receptor (AHR) and an AHR-repressor (AHRR) in skin cells is very high in barrier organs and skin cells, and AHR serves to regulate the induction of xenobiotic metabolizing enzymes (XME), strengthen the capacity of an epithelial barrier, and be involved in development and function. Skin toxicity of PAHs was reported long before it was found that they are a strong AHR ligand. When PAHs such as benzo[α]pyrene which is an AHR activator in the human body are exposed to the skin, chloracne, pigmentation, keratosis, and skin cancer may be caused and an autoimmune disease may get worse.

Accordingly, in recent years, the use of antipollution cosmetics having a protection effect such as fine dust blocking and fine dust cleansing is increasing rapidly. In particular, as various physiological functions of natural materials are of great interest, natural materials are being used as a raw material of a functional product.

As technology of a cosmetic composition for anti-fine dust using a plant extract, Korean Patent Registration Publication No. 10-1873218 entitled "Composition for relieving skin irritation and skin inflammation caused by fine dust, containing a holy basil, peppermint, and neem extract mixture as an effective component" and the like are disclosed in Korea.

A black hoof mushroom (*Phellinus linteus*) is also referred to as a woody mud mushroom, is registered as "Sangmogi (桑木耳)" in Dong-uibogam, is known to have an excellent anticancer effect, and is cultivated in large quantities in Korea as a valuable medicinal material, and when it is decocted for medicinal purposes, it looks clear in yellow or light yellow and tastes pure and light, and thus, is excellent for edibles. In addition, regarding antioxidant efficacy, it has been reported that the black hoof mushroom prevents skin aging by exerting better efficacy in inhibiting production of free radicals harmful to the human body than existing antioxidants. In addition, it has been reported that a shiitake mushroom (*Lentinula edodes*) and an oyster mushroom (*Pleurotus ostreatus*) also have an anticancer effect, and in the present invention, it is reported that combination mushrooms thereof have further strong anti-fine dust effect and skin protection effect from ultraviolet rays.

Conventionally, Korean Patent Registration No. 10-2018883 discloses "a cosmetic raw material composition including a *Rubus coreanus* fruit fermented product by black hoof mushroom mycelium and a functional cosmetic composition including the same", and Korean Patent Registration No. 10-1677362 discloses a cosmetic composition including a fermented product of a black hoof mushroom extract.

The present inventors conducted research to discover domestic native plant materials for protecting the skin from fine dust, and finally, selected a black hoof mushroom, a shiitake mushroom, and an oyster mushroom by primary screening. It was confirmed that an extract prepared by subcritical extraction after ultra-high pressure pre-treatment of the mushroom combination has a greatly increased inhibitory effect of melanin caused by ultraviolet rays and fine dust and shows improvement of skin hyperpigmentation, inhibition of skin cell damage, and skin barrier strengthening activity, thereby completing the present invention.

DISCLOSURE

Technical Problem

An object of the present invention is to provide a cosmetic composition including a mushroom extract including a black hoof mushroom and the like prepared by extracting a black hoof mushroom, a shiitake mushroom, and an oyster mushroom as an effective component.

The present invention provides, in an aspect, a composition which inhibits damage of skin cells by fine dust, by regulating the expression amount of specific genes to a normal level in skin cells damaged by fine dust.

Another object of the present invention is to provide a method of preparing an extract of a black hoof mushroom, a shiitake mushroom, and an oyster mushroom which inhibits production of melanin in the skin caused by ultraviolet rays and fine dust and is excellent in improvement of skin hyperpigmentation, skin barrier strengthening, and moisturizing ability increasing activity.

Technical Solution

In one general aspect, a cosmetic composition which protects the skin from fine dust and ultraviolet rays to show a skin protection effect such as an excellent melanin inhibition effect includes an extract of a black hoof mushroom, a shiitake mushroom, and an oyster mushroom.

Advantageous Effects

The extract of a black hoof mushroom, a shiitake mushroom, and an oyster mushroom according to the present invention is prepared from natural materials and is safe, and it has an excellent activity to improve skin hyperpigmentation caused by fine dust and ultraviolet rays and may be useful as cosmetics for improving skin hyperpigmentation and strengthening skin barriers.

BEST MODE

A detailed description thereof will be provided below. Meanwhile, each of the descriptions and the embodiments disclosed in the present invention may be applied to each of other descriptions and embodiments. That is, all combinations of various elements disclosed in the present invention belong to the category of the present invention. In addition, the category of the present invention is not considered to be limited by the detailed description below.

An embodiment of the present invention for achieving the above object is to provide a cosmetic composition for skin protection from fine dust and ultraviolet rays, including an extract of a black hoof mushroom, a shiitake mushroom, and an oyster mushroom.

As the black hoof mushroom of the present invention, all black hoof mushrooms belonging to the *Phellinus* genus of the Hymenochaetaceae family may be used. It is preferred to use wild black hoof mushrooms and it is particularly preferred to use wild black hoof mushrooms which grow wild in Korea.

As the shiitake mushroom, oyster mushrooms of the *Agaricus* genus and all shiitake mushrooms belonging to the *Lentinula* genus may be used. It is preferred to use wild shiitake mushrooms, and it is particularly preferred to use wild shiitake mushrooms which grow wild in Korea.

As the oyster mushroom, all oyster mushrooms belonging to the Pleurotaceae family of the Agaricales order of Agaricomycetes may be used. It is preferable to use wild oyster mushrooms and it is particularly preferred to use wild oyster mushrooms which grow wild in Korea.

The extraction method and conditions of the natural extract are not largely limited, and known technologies may be appropriately used for preparing the extract. As an example of the extraction method, hot water extraction, reflux extraction, and the like are used to perform extraction from natural materials to obtain a solution, but the present invention is not limited thereto, of course, and a filtration process for removing solids may be further performed after extraction. An extraction temperature and an extraction time are not largely limited, and the extraction temperature may be a temperature at which destruction of nutrients may be minimized, and as an example, extraction may be performed at 30 to 70° C. for 0.1 to 10 hours. However, it is only described as a specific example, and the present invention is not interpreted as being limited thereto.

As another example, in the present invention, a supercritical extract is prepared for preparing the extract of a black hoof mushroom, a shiitake mushroom, and an oyster mushroom.

In order to prepare the supercritical extract, first, a black hoof mushroom, a shiitake mushroom, and an oyster mushroom are dried and crushed into powder.

As an extraction solvent, polyhydric alcohols such as isopropyl alcohol, propylene glycol, and butylene glycol may be used, and it is preferred that 1,3-butylene glycol and ethanol are mixed at the same mass ratio and stirred to be a single phase and used as a cosolvent.

The extraction of the supercritical fluid used in the present invention may be carried out by a common method using carbon dioxide, and specifically, it is preferred to carry out the extraction as follows.

The crushed mushrooms and the cosolvent are mixed and stirred. A mixing ratio of the crushed mushrooms and the cosolvent is 1:2.5 to 6.5 at a mass ratio, and preferably, a mixing ratio of 1:4 at a mass ratio is the best in terms of yield. Subsequently, the mixture is added to a supercritical extraction tank, carbon dioxide is supplied to the extraction tank using a gas pump for high pressure, and the pressure is increased. Subsequently, the temperature inside the extraction tank is raised up to 40° C. and is maintained. Then, while carbon dioxide is continuously supplied to the extraction tank, a pressure regulator attached to an outlet is used to discharge an extract. The temperature of the pressure regulator is adjusted to prevent blockage of a tube at the final outlet which is caused by carbon dioxide transferred to solid dry ice due to pressure and temperature drop of the discharged products. It is preferred that the temperature is about 60° C. The discharged extract is reduced to normal pressure, so that carbon dioxide and the mushroom extract are separated, and carbon dioxide is released into the atmosphere and the mushroom extract is recovered. In order to increase an extract yield, the process may be repeated several times.

The supercritical extract of a black hoof mushroom, a shiitake mushroom, and an oyster mushroom according to the present invention, which is prepared as described above, may be added to cosmetics related to skin elasticity, wrinkle improvement, and whitening such as face lotions, nutrient face lotions, nutrient creams, essences, packs, cleansing creams, cleansing foams, cleansing water, and massage creams, and it is preferred to add the extract at 0.01 to 20.0 wt % with respect to the total weight of the composition. When it is added at less than 0.01 wt %, the efficacy is insignificant, and when it is added at more than 20.0 wt %, the feeling of use as a cosmetic is poor, so that it is inappropriate to be used in a thin product such as a lotion.

Hereinafter, the examples, the comparative examples, the preparation examples, and the test examples are intended to describe the present invention in more detail, and the right scope of the present invention is not limited thereby.

Regarding the effect of the present invention, in one aspect, specifically, genes in skin cells of which the expression amount is affected by fine dust in the present invention include IL1B (NM 000576), IL-36G (NM 019618), S100A7 (NM_002963), LCE3D (NM_032563), PTGS2 (NM_000963), XDH (NM_000379), and the like. Therefore, when the expression amount of these genes is suppressed to be regulated to a normal level, damage of skin cells may be inhibited.

The genes of which the expression amount is increased by fine dust, which are used in the present invention, are as follows (Table 1), and in the table, "Name" refers to the gene bank accession ID of NCBI, "Gene Symbol" refers to an official gene symbol, and "Gene title" refers to the name of each gene.

TABLE 1

Increase gene

| Name | Gene Symbol | Gene title |
| --- | --- | --- |
| NM_002963 | S100A7 | S100 calcium binding protein A7 |
| NM_032563 | LCE3D | late cornified envelope 3D |
| NM_019618 | IL36G | interleukin 36, gamma |
| NM_000576 | IL1B | interleukin 1, beta |
| NM_000963 | PTGS2 | Cyclooxygenase-2 (COX-2) |
| NM_000379 | XDH | XDH xanthine dehydrogenase |

The expression amount of the genes or proteins may be analyzed using various analysis methods known in the art, such as microarray, PCR, next generation sequencing (NGS), Western blot, Northern blot, ELISA, radioimmunoassay, radioimmunodiffusion, tissue immunostaining, and immunoprecipitation assay.

The cosmetic composition for anti-fine dust of the present invention may have a formulation selected from the group consisting of external skin ointments, creams, softening face lotions, nutrient face lotions, pack, essence, hair tonics, shampoos, conditioners, hair conditioners, hair treatments, gels, skin lotions, skin softeners, skin toners, astringents, lotions, milk lotions, moisturizing lotions, nutrient lotions, massage creams, nutrient creams, eye creams, moisturizing creams, hand creams, foundations, nutrient essences, sunscreens, soaps, cleansing foams, cleansing lotions, cleansing creams, body lotions, and body cleansers, but is not limited thereto. The composition of each formulation may include various bases and additives which are needed and appropriate for the formulation, and the type and the amount of these components may be easily selected by a person skilled in the art.

When the formulation of the present invention is a paste, cream, or gel, animal oil, vegetable oil, wax, paraffin, starch, tragacanth, cellulose derivatives, polyethylene glycol, silicone, bentonite, silica, talc, zinc oxide, or the like may be used as a carrier component.

When the formulation of the present invention is a powder or spray, lactose, talc, silica, aluminum hydroxide, calcium silicate, or polyamide powder may be used as a carrier component, and in particular, when it is a spray, a propellant such as chlorofluorohydrocarbon, propane/butane, or dimethyl ether may be further included.

When the formulation of the present invention is a solution or emulsion, solvents, solubilizers, or emulsifiers are used as a carrier component, and for example, water, ethanol, isopropanol, ethyl carbonate, ethyl acetate, benzyl alcohol, benzyl benzoate, propylene glycol, 1,3-butylglycol oil, glycerol aliphatic ester, polyethylene glycol, fatty acid ester of sorbitan, or the like may be used.

When the formulation of the present invention is a suspension, a liquid diluent such as water, ethanol, or propylene glycol, a suspension such as ethoxylated isostearyl alcohol, polyoxyethylene sorbitol ester, and polyoxyethylene sorbitan ester, microcrystalline cellulose, aluminum metahydroxide, bentonite, agar, tragacanth, or the like may be used as a carrier component.

When the formulation of the present invention is a surfactant-containing cleanser, aliphatic alcohol sulfate, aliphatic alcohol ether sulfate, sulfosuccinic acid monoester, isethionate, imidazolinium derivatives, methyltaurate, sarcosinate, fatty acid amide ether sulfate, alkylamidobetaine, aliphatic alcohol, fatty acid glyceride, fatty acid diethanolamide, vegetable oil, lanoline derivatives, ethoxylated glycerol fatty acid ester, or the like may be used as a carrier component.

In addition, the present invention relates to a cosmetic including the anti-fine dust cosmetic composition.

Hereinafter, the present invention will be described in more detail by the following examples. These examples are provided only for specific illustration of the present invention, and it will be apparent to a person skilled in the art that according to the gist of the present invention, the scope of the present invention is not limited to these examples.

BEST MODE FOR CARRYING OUT THE INVENTION

Hereinafter, the present invention will be described in more detail by way of following the examples. However, the following examples are only illustrative of the present invention, and the scope of the present invention is not limited to the examples.

Examples 1 to 7

(Preparation of Supercritical Extract of Wild Black Hoof Mushroom, Shiitake Mushroom, and Oyster Mushroom)

A woody mud mushroom (*P. linteus*) or a deciduous mud mushroom (*P. pini*) which are native to the Korean peninsula as a wild black hoof mushroom, and a wild shiitake mushroom and a wild oyster mushroom were dried in a cool place out of sunlight until there was no change in weight, and they were mixed in equal amounts and crushed into a size of 1 cm or less in diameter by a mechanical way. In addition, 1,3-butylene glycol and ethanol were mixed at the same mass ratio and then stirred to prepare a cosolvent of a single phase.

The crushed mushrooms and the cosolvent were mixed at a mass ratio of 1:4 and stirred for 30 minutes, and the mixture of mushrooms and cosolvent was added to a supercritical extraction tank having an internal volume of 1.5 L and the extraction tank was sealed. Carbon dioxide was supplied to the extraction tank using a gas pump for high pressure, the pressure was increased, and when the pressure of the extraction tank reached 300 atm, the supply of carbon dioxide was stopped. The temperature inside the extraction tank was raised to 40° C. at a rate of 0.5/min using heating wire wrapped around the outside of the extraction tank using a PID temperature controller. The pressure of the extraction tank by heating was maintained at 300 atm by emitting some carbon dioxide using the pressure regulator attached to the outlet of the extraction tank. In addition, the temperature and the pressure of the extraction tank was maintained at 40° C. and 300 atm for 30 minutes. The gas pump for high pressure was restarted to continuously supply carbon dioxide to the extraction tank at a flow rate of 12 L/min. Simultaneously, the extract was discharged using the pressure regulator attached to the outlet, while the temperature of the pressure regulator was maintained at 60° C. The discharged extract was reduced to normal pressure, so that carbon dioxide and the mushroom extract were separated, and carbon dioxide was released to the atmosphere. The separated mushroom extract was recovered using a glass collector. During the processes, from the process of heating the temperature inside the extraction tank to 40° C. at a rate of 0.5° C./min to the process of recovering the separated mushroom extract were repeated several times for 10 hours, extraction was finished, and the obtained extract was used as a sample (S1). The black hoof mushroom (S2), the shiitake mushroom (S3), and the oyster mushroom (S4) alone, or the black hoof mushroom+the shiitake mushroom (S5) and the black hoof mushroom+the oyster mushroom (S6) are as indicated in parentheses (Table 2).

TABLE 2

|  | Black hoof mushroom | Shiitake mushroom | Oyster mushroom |
|---|---|---|---|
| Example 1 | ○ | ○ | ○ |
| Example 2 | ○ | — | — |
| Example 3 | — | ○ | — |
| Example 4 | — | — | ○ |
| Example 5 | ○ | ○ | — |
| Example 6 | ○ | — | ○ |
| Example 7 | — | ○ | ○ |

Experimental Example 1] Confirmation of Cytotoxicity in Conditions of Ultraviolet Ray Irradiation and Fine Dust Treatment In order to confirm whether there was cytotoxicity, a B16F10 cell line was cultured in a DMEM medium to which 10% FBS was added, was inoculated into a 96 well plate at a cell concentration of $2 \times 10^4$, respectively, and was cultured in a 5% $CO_2$ incubator at 37° C. for 24 hours. After the incubation, the medium was removed, the plate was placed in a UV irradiator (BLX-312, Vilber Lourmal, France) and was irradiated with ultraviolet rays at a light quantity of 30 mJ/cm$^2$ using a UV lamp, and was treated with fine dust at a concentration of 50 µg/ml. The fine dust was used in the form of being diluted in dimethyl sulfoxide (Urban particulate matter NIST SRM 1648a, Sigma-Aldrich, USA). The sample prepared in the example was diluted in dimethyl sulfoxide so that the concentration was 0.1, 1.0, or 2.0% to prepare a dilute solution, which was treated and incubated for 24 hours, 100 ml of a 3-[4,5-dimethylthiazol-2yl]-2,5-diphenyltetrazoliumboromide (MTT, Sigma, USA) solution was added to each well (3 mg/ml), and incubation was further performed for 4 hours. Thereafter, the supernatant was removed, 150 µl of dimethyl sulfoxide was added, shaking was performed for 30 minutes to produce formazan, which was dissolved, and its absorbance at 540 nm was measured using a multimicroplate reader (Molecular device Spectra max190). The results are shown in the following Table 3.

TABLE 3

| | Cell viability (%) B16F10 | | |
|---|---|---|---|
| Classification | 0.5% | 1.0% | 2.0% |
| Ultraviolet rays/fine dust x | 123 | 129 | 125 |
| Control group (ultraviolet rays/fine dust ○) | 100 | 100 | 100 |
| Example 1 | 101 | 100 | 101 |
| Example 2 | 100 | 101 | 102 |
| Example 3 | 98 | 98 | 96 |
| Example 4 | 99 | 100 | 99 |
| Example 5 | 100 | 99 | 98 |
| Example 6 | 101 | 99 | 99 |
| Example 7 | 98 | 99 | 96 |

As seen from the results of Table 3, since all of the samples to which the extract of a black hoof mushroom, a shiitake mushroom, and an oyster mushroom was applied under the conditions of ultraviolet ray irradiation and fine dust treatment showed a cell viability of 95% or more, it was confirmed that the cytotoxicity of B16F10 was not affected.

[Experimental Example 2] Confirmation of Whether Melanin Production was Inhibited Under Conditions of Ultraviolet Ray Irradiation and Fine Dust Treatment In order to confirm melanin production inhibition efficacy under conditions of ultraviolet ray irradiation and fine dust treatment, B16F10 cells were inoculated into a 24 well plate at a cell concentration of $4 \times 10^5$, respectively and cultured in a 5% $CO_2$ incubator at 37° C. for 24 hours. After incubation, the medium was removed, washing with phosphate buffered saline (PBS) was performed once, and 1 ml of PBS was added to each well. The plate was placed in a UV irradiator and was irradiated with ultraviolet rays at a light quantity of 30 mJ/cm$^2$ using a TV lamp, and was treated with fine dust at a concentration of 50 µg/ml. The preparation examples and the examples of the present invention were added to the medium at 1% and 2%, respectively to treat the cells, and the cells were cultured for 72 hours. Arbutin was used as a positive control group, and the sample was replaced once daily.

In order to confirm the melanin production rate, the medium was removed, and the cells were washed once with PBS. Thereafter, 500 µl of 1 N NaOH was added to each well, shaking was performed for 30 minutes to dissolve produced melanin, and an absorbance at 405 nm was measured using a multimicroplate reader. The results are shown in the following Table 4.

TABLE 4

| | Melanin production rate (%) B16F10 | |
|---|---|---|
| Classification | 1.0% | 2.0% |
| Ultraviolet rays/fine dust x | 49 | |
| Control group (ultraviolet rays/fine dust ○) | 100 | |
| Example 1 | 62 | 58 |
| Example 2 | 76 | 72 |
| Example 3 | 93 | 91 |
| Example 4 | 95 | 96 |
| Example 5 | 73 | 69 |
| Example 6 | 77 | 69 |
| Example 7 | 89 | 85 |

As seen from the results of Table 4, the extract of a black hoof mushroom, a shiitake mushroom, and an oyster mushroom showed better melanin production inhibition efficacy as compared with the black hoof mushroom, the shiitake mushroom, and the oyster mushroom alone.

This shows that the extract of a black hoof mushroom, a shiitake mushroom, and an oyster mushroom had an excellent effect of improving skin hyperpigmentation caused by ultraviolet rays and fine dust as compared with the case of using the mushrooms alone.

[Experimental Example 3] Confirmation of Whether Expression of MC1R Related to Melanin Production and AhR mRNA Related to Heavy Metal Toxicity Relief was Inhibited Under Conditions of Ultraviolet Ray Irradiation and Fine Dust Treatment In order to confirm the mRNA expression inhibition efficacy of MC1R which is an ultraviolet ray receptor related to melanin production and AhR which is a fine dust receptor which is known to be induced by environmental toxic materials, polycyclic aromatic hydrocarbon, bacteria, and the like, under conditions of ultraviolet ray irradiation and fine dust treatment, B16F10 cells were inoculated into a 24 well plate at a cell concentration of $3 \times 10^6$, respectively, and cultured in a 5% $CO_2$ incubator at 37° C. for 24 hours. After incubation, the medium was removed, washing with phosphate buffered saline (PBS) was performed once, and 1 ml of PBS was added to each well. The plate was placed in a UV irradiator and was irradiated with ultraviolet rays at a light quantity of 30 mJ/cm² using a TV lamp, and was treated with fine dust at a concentration of 50 µg/ml. The extracts of the preparation examples and the examples were added to the medium at 1% and 2%, respectively to treat the cells, and the cells were cultured for 24 hours.

Thereafter, B16F10 cells were recovered using a Trizol reagent (invitrogen, USA), mRNA was extracted, and cDNA was synthesized through a series of processes. MC1R and AhR genes were amplified from the synthesized cDNA and the expression amount of genes was confirmed by electrophoresis, and gene amplification was performed under conditions of 95° C. for 5 minutes 1 cycle/95° C. for 1 minute/51° C. for 2 minutes/72° C. for 1 minute 28 cycle amplification, reaction at 72° C. for 5 minutes, after mixing 10× taq polymerase buffer, 10 mM dNTP, 10 pmol primer, and taq polymerase using a thermal cycler (GenePro, Hangzhou bioer tech., CHINA) and adding distilled water to adjust the volume to 50 µl. Each primer sequence is shown in Table 5. The expression amount values of MC1R and AhR were corrected by dividing the expression amount by each expression amount of β-actin, and the results are shown in the following Table 6.

TABLE 5

| Gene | Sequence (5'→3') |
|---|---|
| MC1R | F: CCT CTG CCT CAA GGG TGC TG<br>R: TCA ACA GTG GAG CTG AGG ACG |
| AhR | F: GGT GCC TGC TGG ATA ATT CAT CTG<br>R: TCG TCC TTC TTC ATC CGT CAG TG |
| β-Actin | F: TGG AAT CCT GTG GCA TCC ATG AAA<br>R: TAAA ACG CAG CTC AGT AAC AGT CCG |

TABLE 6

| | Expression amount of mRNA | | | |
|---|---|---|---|---|
| | MC1R/β-actin | | AhR/β-actin | |
| Classification | 1.0% | 2.0% | 1.0% | 2.0% |
| Ultraviolet rays/fine dust x | 1.00 | | | |
| Control group (ultraviolet rays/fine dust o) | 5.56 | | 3.23 | |
| Example 1 | 4.53 | 3.95 | 2.81 | 2.53 |
| Example 2 | 5.17 | 4.54 | 3.12 | 2.98 |
| Example 3 | 5.43 | 5.34 | 3.18 | 3.11 |
| Example 4 | 5.45 | 5.32 | 3.21 | 3.10 |
| Example 5 | 5.03 | 4.84 | 3.00 | 2.85 |
| Example 6 | 5.02 | 4.76 | 3.03 | 2.81 |
| Example 7 | 5.33 | 5.22 | 3.10 | 3.02 |

As seen from the results of Table 6, the extract of a black hoof mushroom, a shiitake mushroom, and an oyster mushroom effectively suppressed the increase in mRNA expression of MC1R and AhR by ultraviolet rays and fine dust in a B16F10 cell line, as compared with the extract alone. As a result, it was confirmed that the extract of a black hoof mushroom, a shiitake mushroom, and an oyster mushroom had an excellent mRNA regulatory effect to MC1R and AHR, as compared with the control group, and had effects of inhibition of skin hyperpigmentation and detoxification of a heavy metal-derived reaction, which were caused by ultraviolet rays and fine dust.

[Experimental Example 4] Confirmation of Hyaluronic Acid Production Amount

Hyaluronic acid (HA) is a polymer compound in the form of glycoside having a molecular weight of 200-400 thousand and is synthesized mainly by a hyaluronic acid synthase (HAS) of keratinocytes and fibroblasts and accumulated in extracellular matrix, and a decrease in HA is the cause of skin aging such as wrinkle formation, atrophy of epidermis, decreased number of skin bonds, and decreased skin elasticity.

In order to confirm whether the extract of a black hoof mushroom, a shiitake mushroom, and an oyster mushroom increased the hyaluronic acid (HA) production amount in HaCaT which is a keratinocyte, measurement was performed with an ELISA kit, and the results are shown in Table 7. In Table 7, N (normal) is a BP (benzo[α]pyrene)-unstimulated group, and C (control) is a BP (benzo[α]pyrene)-stimulated group.

TABLE 7

| N | C | Classification (µg/mL) | Example 1 | Example 2 | Example 3 | Example 4 | Example 5 | Example 6 | Example 7 | EGCG 10 µg/mL |
|---|---|---|---|---|---|---|---|---|---|---|
| 198 | 99.3 | 100 | 143.1 | 120.1 | 108.1 | 106.3 | 123.2 | 122.1 | 105.1 | 105.6 |
| | | 250 | 150.2 | 122.2 | 110.2 | 108.1 | 126.3 | 125.3 | 107.2 | |
| | | 500 | 153.2 | 125.3 | 112.8 | 110.7 | 129.2 | 128.2 | 110.8 | |

As confirmed from Table 7, the extract of a black hoof mushroom, a shiitake mushroom, and an oyster mushroom had an increased hyaluronic acid production amount at a concentration of 500 μg/mL as compared with the control group (C, control; 99.3 ng/mL), and EGCG which was the control group showed an increase rate of 6.3 ng/mL at 10 μg/mL.

As a result, since the extract of a black hoof mushroom, a shiitake mushroom, and an oyster mushroom showed a high increase in hyaluronic acid (HA) production, the excellent effect of the black hoof mushroom, the shiitake mushroom, and the oyster mushroom was confirmed.

The present invention has been described in detail in specific parts, and it will be apparent to a person skilled in the art that such specific technique is only a preferred embodiment and the scope of the present invention is not limited thereby. Thus, the substantial scope of the present invention will be defined by the appended claims and their equivalents.

The invention claimed is:

1. A method of preparing a cosmetic composition for caring for skin damage from fine dust and ultraviolet rays, the method comprising:
   (A) an ultra-high pressure pre-treatment of putting a black hoof mushroom, a shiitake mushroom, and an oyster mushroom, or a black hoof mushroom, a shiitake mushroom, and an oyster mushroom to which an extraction solvent is added in a plastic pouch and sealing the pouch, and performing a pressure treatment with water under conditions of 40 to 50° C. and 60 to 80 MPa for 100 to 120 minutes;
   (B) a subcritical extraction of adding an extraction solvent and performing extraction under conditions of 120 to 200° C. and a pressure of 0.1 to 15 MPa for 10 to 30 minutes; and
   (C) performing filtration.

2. The method of preparing the cosmetic composition for caring for skin damage from fine dust and ultraviolet rays of claim 1, wherein the extraction solvent in (A) or (B) is at least one selected from the group consisting of water, anhydrous alcohol having 1 to 4 carbon atoms, ethyl acetate, acetone, glycerin, ethylene glycol, propylene glycol, butylene glycol, caprylic/capric triglyceride, dimethicone, mineral oil, cyclomethicone, octyldodecanol, acetylethyl hexanoate, triethylhexanoin, isopropyl myristate, and vegetable oil.

* * * * *